United States Patent [19]
Killingsworth

[11] Patent Number: 6,113,990
[45] Date of Patent: Sep. 5, 2000

[54] METHOD FOR PROVIDING FIRE RETARDANCY, MICROBIAL, AND PEST CONTROL TO A STRUCTURE

[75] Inventor: B. Farrell Killingsworth, Cantonment, Fla.

[73] Assignee: Environmental Security, Inc., Cantonment, Fla.

[21] Appl. No.: 09/276,432

[22] Filed: Mar. 25, 1999

Related U.S. Application Data

[60] Provisional application No. 60/079,330, Mar. 25, 1998.

[51] Int. Cl.$^7$ ...................................................... B05D 1/34
[52] U.S. Cl. ........................................... 427/426; 427/196
[58] Field of Search ...................................... 427/196, 426

[56] References Cited

U.S. PATENT DOCUMENTS

| | | | |
|---|---|---|---|
| 4,173,666 | 11/1979 | Quinto | 427/427 |
| 4,187,983 | 2/1980 | Boyer | 239/9 |
| 4,191,224 | 3/1980 | Bontranger et al. | 141/100 |
| 4,419,256 | 12/1983 | Loomis | 252/62 |
| 4,595,414 | 6/1986 | Shutt | 106/18.16 |
| 4,773,960 | 9/1988 | Vincelli et al. | 156/357 |
| 5,019,195 | 5/1991 | Skinner | 156/71 |
| 5,194,323 | 3/1993 | Savoy | 428/305.5 |
| 5,403,128 | 4/1995 | Thomas | 406/39 |
| 5,455,065 | 10/1995 | Rood | 427/203 |
| 5,516,580 | 5/1996 | Frenette et al. | 428/288 |
| 5,525,147 | 6/1996 | Dunstan et al. | 106/18.3 |
| 5,534,301 | 7/1996 | Shutt | 427/377 |
| 5,601,849 | 2/1997 | Dunstan et al. | 424/660 |
| 5,612,094 | 3/1997 | Schubert et al. | 427/397 |
| 5,684,068 | 11/1997 | Boyer et al. | 524/40 |
| 5,853,802 | 12/1998 | Boyer et al. | 427/207.1 |

OTHER PUBLICATIONS

Kirk–Othmer Encyclopedia of Chemical Technology, 3rd Ed., Boron Compounds (Oxides, Acid, Borates), vol. 4, pp. 71–85, 96–99, Jan. 1978.

Tim–bor Insecticide; literature; 11 pages (No Date).

*Primary Examiner*—Shrive Beck
*Assistant Examiner*—Jennifer Calcagni
*Attorney, Agent, or Firm*—Jones & Askew LLP

[57] ABSTRACT

A method of insulating a structure and providing fire retardancy, microbial and pest control to the structure is disclosed. A slurry of a dry boric acid stabilized cellulose insulation product and a borate salt solution is applied to the area to be insulated.

5 Claims, 1 Drawing Sheet

METHOD FOR PROVIDING FIRE RETARDANCY, MICROBIAL, AND PEST CONTROL TO A STRUCTURE

RELATED APPLICATION

This application claims priority to provisional patent application Ser. No. 60/079,330, filed on Mar. 25, 1998.

FIELD OF THE INVENTION

The present invention is generally in the area of controlling microbes, pests and fire in building structures. More specifically, the invention is directed to a method of application of insulation to a structure to provide fire retardancy and microbial and pest control efficacy to the structure.

BACKGROUND OF THE INVENTION

Structures conforming to energy codes that require very low air-infiltration of down to 0.5 exchanges per hour within the structure are likely to develop condensation within the walls, resulting in microbial growth, particularly fungal growth. The microbes gain sustenance from the cellulose structural members. Moreover, the proliferation of microbes within the walls may further increase the moisture content. Structural strength can be greatly compromised by such microbial growth and biodegradation of the support members. In addition, the microbes generate metabolic gases and fungi spores that compromise air quality and produce allergens within the living space.

Inorganic boron containing compounds have been used as wood preservatives and fire retardants for many years. The basic compounds are readily available, inexpensive and relatively harmless to humans and their toxicity to fungi, termites, and wood destroying insects has been clearly established. At higher levels of treatment, borates are also effective as fire retardants for lumber and other wood products. For example, U.S. Borax Inc. manufactures a product known as TIM-BOR® which is a water soluble inorganic borate salt (disodium octaborate tetrahydrate ($Na_2B_8O_{13} \times 4H_2O$)). The product is recommended for use as a 10% or 15% solution or as a foam for control of wood destroying organisms including drywood, dampwood and subterranean termites, wood-boring beetles, carpenter ants, dry-rot fungi and other organisms.

One currently used cellulose fiber based sound and thermal insulation product made from ground after-market cellulose material such as newspaper, cardboard and like cellulose products, is treated with ortho-boric acid ($H_3BO_3$) to control biodegradation of the otherwise biodegradable cellulose insulation under temperature and moisture conditions likely to exist within walls of dwelling structures. The boric acid treated cellulose also provides superior fire rating and superior air infiltration control over fiberglass insulation. Unlike fiberglass, boric acid stabilized cellulose is not considered a carcinogen. The insulation is applied, as is fiberglass insulation, within the wall voids, between the studs and in the attic, between and above ceiling joists.

Boric acid will only control pests if the pests contact the acid. Boric acid will also kill fungi upon contact. Boric acid has very low solubility in water, only 4.7% at 20° C., and thus, even if the boric acid treated cellulose becomes wet, the boric acid will not sufficiently leach from the cellulose to penetrate and treat the actual structural members. Boric acid stabilized cellulose as described above thus will treat only those microbes or pests which actually contact the cellulose. In other words, the boric acid will not protect the actual structural members from pests, such as termites and beetles, microbes, such as fungi, or from fire. The boric acid is, in large part, locked out of the structure per se and contributes little or nothing to the fire rating of the actual structural members or to structural pest control.

SUMMARY OF THE INVENTION

A method of installation of boric acid treated cellulose insulation combined with treatment of the actual structural members with borate salt is described, providing a much higher degree of fire retardancy and microbial and pest control to the structure. The method involves the use of a salt solution of borate that is applied along with the cellulose insulation as a slurry and that is also optionally applied directly to the structural members of the building. The borate salt diffuses into the wood osmotically via the moisture (usually 10–20%) inherently within the wood. By translocation through an ion equilibrium in the wood, placement of boron occurs throughout the breath of wood structural members. This placement of borate, being dynamic and subject to future equilibrium forces, ensures placement of boron at the areas of higher moisture content, where microbes are more likely to reside and flourish. For example, condensation proximal to a window, door or improperly insulated corner would result in a localized redistribution of boron to the area of condensation. Infestations of any wood infesting organisms (e.g. insects, arachnids, fungi, bacteria) undergoing respiration would also result in localized moisture elevation, leading to boron translocation to that area.

DETAILED DESCRIPTION OF THE INVENTION

The Insulation

Figure 1:
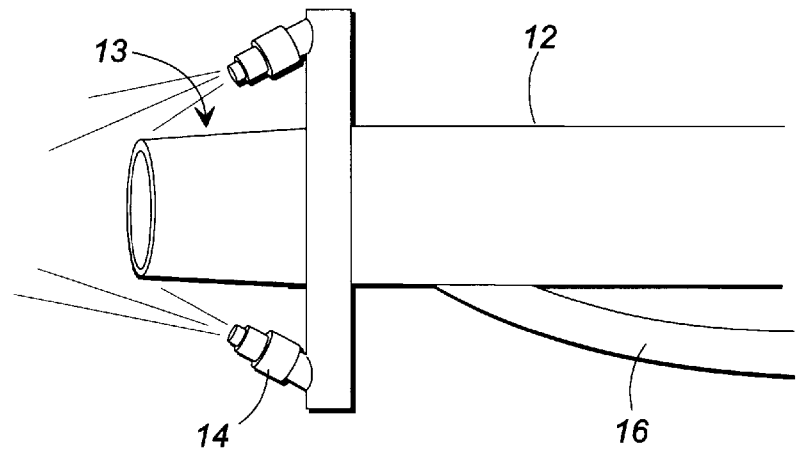
FIG. 1 is a side view of a device for application of the insulation into a wall void.

The insulation is preferably ortho-boric acid stabilized cellulose, although other absorbent insulations may be used. Any number of cellulose based insulations may be used, such as, for example, those described in U.S. Pat. No. 5,516,580 to Frenette et al., U.S. Pat. No. 5,455,065 to Rood, U.S. Pat. No. 5,684,068 to Boyer et al, U.S. Pat. No. 5,534,301 to Shutt, and U.S. Pat. No. 4,173,666 to Quinto, the disclosures of which are incorporated herein in their entireties. In general, the insulation includes ground cellulose and an amount of boric acid or other compound sufficient to provide the degree of fire retardancy required by law. This is usually about 10 to 30% by weight boric acid Preferably, the cellulose insulation primarily comprises recycled after-market cellulose material such as newspaper, cardboard and like cellulose products that is ground with a high speed grinder. The ground cellulose is treated with ortho-boric acid ($H_3BO_3$) which renders it fire retardant and pest repellent. For example, the cellulose can be mixed with a solution of boric acid in a mixing vat. The cellulose product is then dried. The concentration of boric acid in some presently used commercial preparations is about 22% by weight.

The Borate Salt Solution

In a preferred embodiment, the salt solution is a 10–30% solution of disodium octaborate tetrahydrate but other borate salts can be used such as boric acid, sodium tetraborate decahydrate, sodium tetraborate pentahydrate, sodium metaborate, sodium perborate hydrates, potassium tetraborate, sodium pentaborate, ammonium pentaborate hydrate, anhydrous sodium tetraborate and the like, and mixtures of the foregoing.

This amount of disodium octaborate tetrahydrate conforms to U.S. Borax label suggested application for TIM-BOR®. The combination of boric acid stabilized cellulose and borate salt will eliminate existing pest and microbial infestation, prevent further pest and microbial infestation, enhance fire retardancy of the structure, and enhance the environmental qualities of the air space within the living area. Such an inclusive borate treatment lessens the need for ozone-eating bromide and other halide gas fumigation of the structure.

Method of Installation

The boric acid treated cellulosic insulation and the borate salt solution can be applied sequentially to the structure to be insulated with the salt solution applied to the structural elements before or after the insulation is installed in a typical way. Preferably, the solution and insulation are applied simultaneously. A solution of the salt can be mixed with the insulation to make a slurry that is applied to the wall voids and/or the attic space.

In a preferred embodiment, the application of insulation and boron salt solution is simultaneous by modifying a currently used method of application of cellulose based insulation. One way cellulose based insulation is applied is by wetting the insulation with water as a dry stream of the ground cellulose is sprayed into the area being insulated. The thus created slurry sticks to the interior face of the outside wall board and studs or to the attic surfaces. By using the solution of borate salt rather than water to create the slurry, some of the water soluble, dispersible salt is distributed onto the wallboard. Engineering of the spray apparatus can directly apply the salt solution to the structural elements while the slurry is applied to the wall voids or attic surface. Moreover, the spray apparatus can be engineered so that the application of slurry and the application of salt solution can be achieved independently as well as simultaneously.

The boric acid stabilized cellulose insulation is applied by blowing the dry cellulose product through a tube, the diameter of which will vary depending upon the surface area being treated. For example, for application to a wall, a three inch plastic flexible tube 12 having a tapered nozzle 13 is appropriate. For application to an attic area a larger hose can be used that does not have a tapered nozzle. The exit end of the tube is adapted with one or more nozzles 14 connected to the borate salt reservoir by tube 16, through which the borate salt solution is sprayed onto the cellulose as it exits the cellulose feeder nozzle 13. The borate salt solution is pumped at a pressure of about 140 to 200 psi. A nozzle such as that disclosed in U.S. Pat. No. 4,187,983, which receives two input hoses can be used.

For application to large surface areas such as an attic, the cellulose insulation and the borate salt solution are retained in separate reservoirs in a truck. Separate hoses from the truck reservoirs deliver insulation and borate salt solution.

Figure 2:
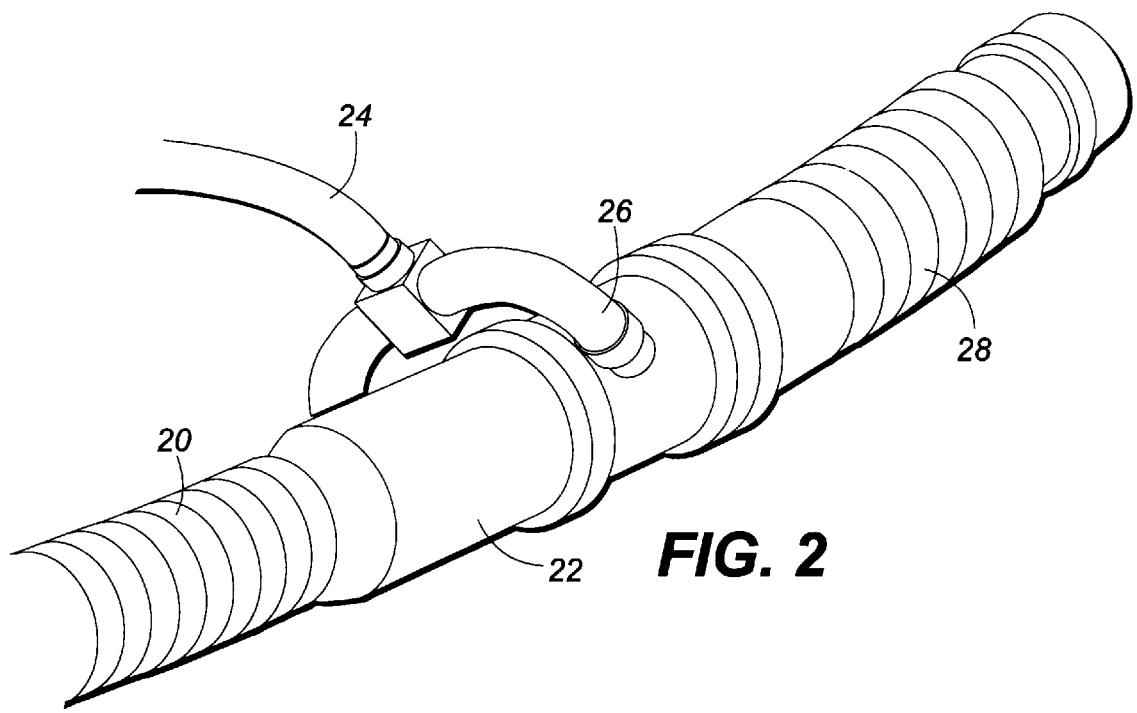
FIG. 2 is a perspective view of a second device for application of the insulation in an attic space.

It may be preferable to use a hose applicator having a mixing chamber such as illustrated in FIG. 2. The supply hose 20, which has a diameter of about three inches directs the cellulose into mixing chamber 22 which has a larger diameter of four inches, for example. The solution supply hose 24 directs solution into the mixing chamber through nozzles 26 and the formed slurry is delivered to the structure through exit hose 28.

This wet mass of cellulose is applied to the area to be insulated such as within the wall voids, i.e. between the wall studs. The solution applying nozzles also are aimed directly at the wood between the studs so as to achieve a pre-wetting of the wood thus resulting in the cellulose better sticking to the wood. The solution applying nozzles can also be positioned to apply the solution directly to the studs and other structural elements. The applicator includes controls so that application of dry cellulose can be paused while the solution only is applied to exposed wood.

A 10–30% solution of disodium octaborate tetrahydrate is used in the solution reservoir. This solution is used to treat any remaining wood that was not otherwise treated in the insulation process.

The teachings of the references cited herein are specifically incorporated herein. Modifications and variations of the present invention will be obvious to those skilled in the art from the foregoing detailed description and are intended to be encompassed by the invention.

What is claimed is:

1. A method of insulating a structure and providing fire retardancy, microbial and pest control to the structure, comprising:

providing a dry boric acid stabilized cellulose insulation product;

providing a borate salt solution;

combining the dry insulation and the solution to form a slurry; and applying the slurry to the area to be insulated;

wherein the insulation and solution are combined using a nozzle that sprays the solution onto the insulation as it exits the nozzle; and further comprising applying a borate salt solution to the structure prior to applying the slurry to the structure.

2. The method of claim 1 wherein the borate salt solution is a 10–30% solution of a borate salt selected from the group consisting of disodium octaborate, sodium tetraborate decahydrate, sodium tetraborate pentahydrate, sodium metaborate, sodium perborate hydrates, potassium tetraborate, sodium pentaborate, ammonium pentaborate hydrate, anhydrous sodium tetraborate, and mixtures of the foregoing.

3. The method of claim 1 wherein the borate salt solution is a 10–30% solution of disodium octaborate tetrahydrate.

4. The method of claim 1 wherein the cellulose insulation product is a cellulose product treated with ortho-boric acid ($H_3BO_3$).

5. The method of claim 1 wherein the cellulose insulation product is made from ground after-market cellulose material.

* * * * *